United States Patent Office 3,537,666
Patented Nov. 3, 1970

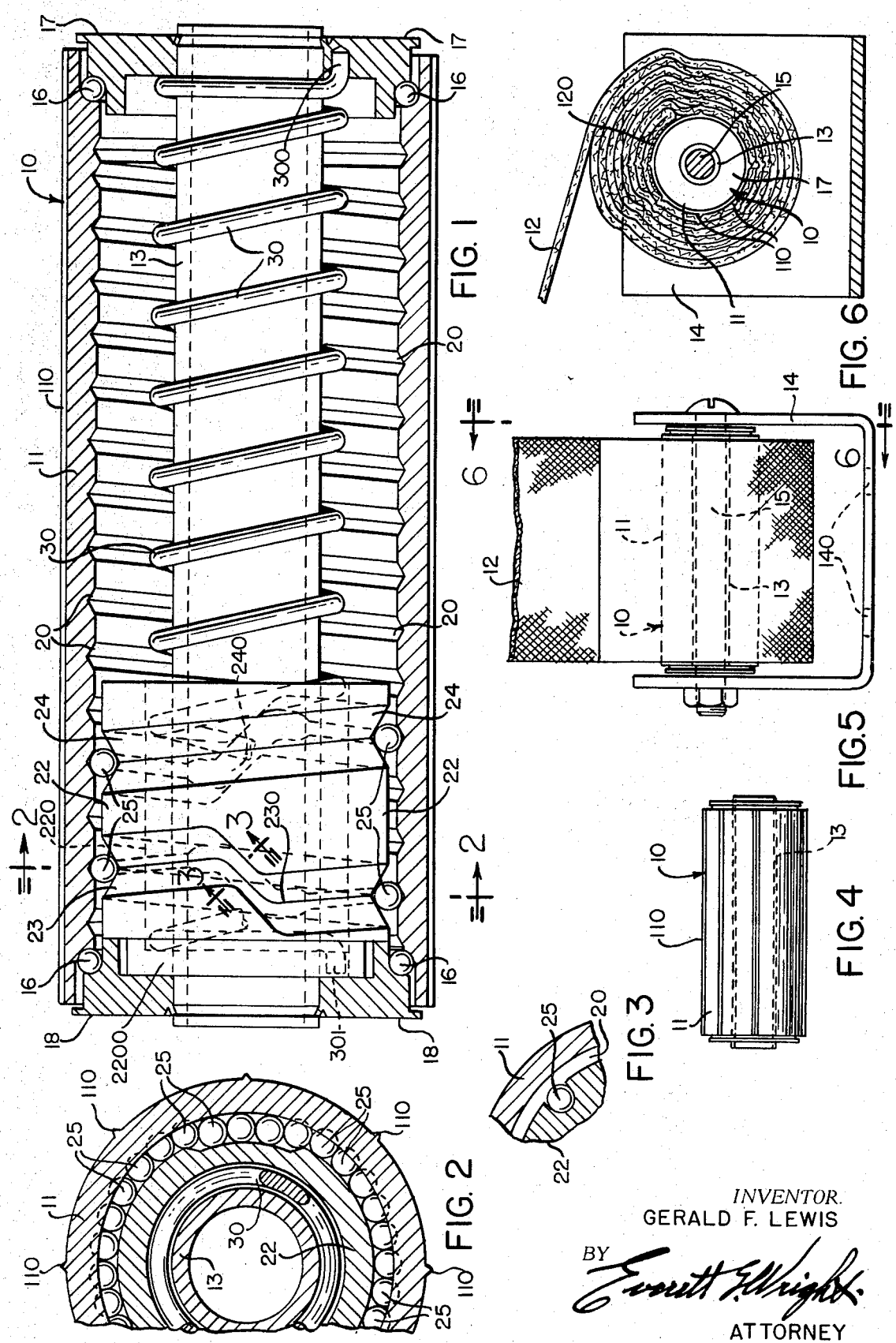

3,537,666
RETRACTOR FOR SEATBELTS AND THE LIKE
Gerald F. Lewis, 1850 Columbia,
Berkley, Mich. 48072
Filed Mar. 20, 1969, Ser. No. 808,778
Int. Cl. B65h 75/48
U.S. Cl. 242—107                              2 Claims

ABSTRACT OF THE DISCLOSURE

A retractor for seatbelts or other manually extended and self-returned spool wound items including a fixed shaft having end caps fixed thereto, an outer sleeve type winding spool disposed in spaced relationship over said fixed shaft mounted for free rotation on said end caps, said winding spool having a helical ball track formed therein, a cylindrical ball nut having a pair of outer helical ball tracks formed therearound, each of the same pitch as the helical ball track in said outer sleeve and including a depressed ball return passage therein, each ball track in said ball nut including its ball return being substantially filled with balls also disposed in running relationship within said helical ball track in said winding spool, compression spring means disposed in spaced relationship around said fixed shaft extending between and anchored to said ball nut and the end cap of one end of said fixed shaft normally biasing said ball nut to the end cap at the other end of said fixed shaft, means nonrotatively supporting said retractor at its central shaft, and a seatbelt secured against rotation with respect to and wound on the said winding spool, manual pulling of said seatbelt outwardly from said winding spool rotating said winding spool in one direction biasing said ball nut toward the end cap at said one end of said fixed shaft and compressing said compression spring, the subsequent release of said seatbelt permitting said compression spring to thrust said ball nut to the end cap at said other end of said fixed shaft thereby counter-rotating said winding spool and causing said seatbelt to become rewound thereon.

---

The primary object of the invention is to provide an improved, rugged, positive and smooth acting spring thrusted ball nut retractor for manually extended and self-returned spool wound items such as seatbelts and the like, which is economical to manufacture and assemble, and which occupies a minimum of space.

Other objects of the invention will become apparent by reference to the following detailed description taken in connection with the accompanying drawings, in which:

FIG. 1 is a greatly enlarged longitudinal sectional view of a spring thrusted ball nut actuated winding spool of a seatbelt retractor embodying the invention;

FIG. 2 is a sectional view taken on the line 2—2 of FIG. 1 showing the depressed ball return of one of the helical ball tracks in the ball nut;

FIG. 3 is a fragmentary sectional view taken on the line 3—3 of FIG. 1;

FIG. 4 is an elevational view indicating a preferred normal size of a seatbelt retractor of the invention;

FIG. 5 is an elevational view showing a seatbelt retractor of the invention with its central shaft fixed in non-rotatable position in the seatbelt retractor support bracket; and FIG. 6 is a vertical sectional view taken on the line 6—6 of FIG. 5.

Referring now to the drawings wherein like reference characters refer to like and corresponding parts through the several views, a spring thrusted ball nut retractor embodying the instant invention is disclosed herein as a seatbelt retractor 10 for illustrative purposes.

The seatbelt retractor 10 consists of an outer sleeve type winding spool 11 preferably having longitudinal outer ribs 110 thereon onto which a seatbelt 12 is non-turnably fixed by suitable means at its inner end at 120, the said seatbelt 12 being wound on the winding spool 11 as best shown in FIGS. 5 and 6. A hollow fixed shaft 13 extends in spaced relationship through the winding spool 11 and is preferably supported in non-turnable relationship on a U-shaped bracket 14 by such means as a bolt 15. The said bracket 14 is secured in the desired position on the floor or elsewhere in a motor vehicle by suitable fastening means (not shown) which extend through apertures 140 provided therefor in the base of the said U-shaped bracket 14.

The outer sleeve type winding spool 11 of the retractor 10 is preferably mounted by means of ball bearings 16 on end caps 17 and 18 which are fixed on opposite end portions of the said central fixed shaft 13. The said winding spool 11 has an inner helical ball screw track 20 formed therein.

A cylindrical ball nut 22 is disposed within the said outlet sleeve type winding spool 11 and has a pair of independent endless helical ball tracks 23 and 24 formed in the outer periphery thereof, each including a depressed ball return groove 230 and 240 respectively therein, the said ball tracks 23 and 24 in the cylindrical ball nut 22 being of the same pitch as the ball screw track 20 formed in the said outer sleeve type winding spool 12. Sufficient balls 25 are disposed in each helical track 23 and 24 and their depressed ball return groove 230 and 240 respectively so as to substantially fill the same. The said balls 25 in the helical tracks 23 and 24 register with and travel in the helical ball screw track 20 formed in the said winding spool 11 while the said balls recirculate in each said helical track 23 and 24 and their depressed ball return grooves 230 and 240 respectively.

The said cylindrical ball nut 22 preferably is axially bored at its inner end 220 to accommodate freely one end of a preferably cylindrical compression spring 30 disposed in spaced relationship around the central hollow fixed shaft 22 of the winding spool 11. One end of the said compression spring 30 abuts against and is anchored at 300 to one end cap 17 at the right-hand end of the winding spool 11 of the seatbelt retractor 10 as viewed in FIG. 2, and, the other end of the said compression spring 30 abuts against and is anchored at 301 to the closed end 2200 of the ball nut 22 which in turn abuts against the other end cap 18 at the left-hand end of the said winding spool 11 of the said seatbelt retractor 10. This is the retracted position of the spring thrusted ball nut seatbelt retractor 10, in which retracted position the seatbelt 12 has been fully or substantially fully wound on said outer sleeve type winding spool 11 responsive to the thrusting of the ball nut 22 to the left as viewed in FIG. 2.

Manual pulling of the seatbelt 12 from the said outer sleeve type winding spool 11 rotates the said winding spool 11 in a "pay-out" direction as indicated by the arrow P in FIGS. 2 and 6, which moves the ball nut 22 to the right from its position shown in FIG. 2 compressing the said compression spring 30 until the said compression spring 30 is substantially fully compressed and the seatbelt 12 has been fully unwound and paid-out from the winding spool 11—the said seatbelt 12 remaining non-turnably anchored thereto.

Subsequent release of the seatbelt 12 from its unwound or paid-out position permits the compression spring 30 to expand longitudinally and bias the ball nut 22 toward or to its fully expanded position, which movement of the ball nut 22 rotates the said outer sleeve type winding spool 11 in its "Retract" direction as indicated by the arrow R in FIGS. 2 and 6 whereby to rewind the said seatbelt 12 on the winding spool 11 of the retractor 10.

It is obvious that retractors of the instant invention can be employed to advantage when relatively powerful, positive and smooth acting retractors for vehicle seatbelts and other usages may be required.

I claim:
1. A retractor for seatbelts or the like comprising:
   a hollow winding spool having a seatbelt fixed thereto and wound thereon having an inner helical ball screw track formed therein,
   a central shaft disposed in spaced relationship through said winding spool including end caps at the ends thereof onto which said winding spool is rotatably mounted,
   means supporting said retractor including means securing said central shaft thereof in non-rotatable relationship with respect thereto,
   a cylindrical ball nut disposed within said hollow winding spool including a pair of helical ball tracks of the same pitch as said helical bal screw track in said winding spool, each ball track in said ball nut having a depressed ball return groove therein and filled with balls registering with the helical ball screw tack of said winding spool, and
   compression spring means disposed longitudinally of and in spaced relationship around said hollow central shaft and anchored at one end to one said end cap and at the other end to said ball nut constantly urging said ball nut to move without rotation toward and to said other end cap,
   pulling on said seatbelt to reel-out the same rotating said winding spool in one direction causing said ball nut to move axially toward said one end cap simultaneously compressing said spring,
   subsequent release of said seatbelt permitting said compression spring to expand and move said ball nut without rotation axially toward said other end cap whereby to rotate said winding spool and rewind said seatbelt thereon.

2. A retractor for seatbelts and the like comprising:
   a hollow outer sleeve type winding spool onto which a seatbelt is wound with the inner end of said seatbelt nonturnably anchored thereto,
   a hollow central shaft extending in spaced relationship through said winding spool and including end caps fixed on opposite ends thereof,
   ball bearing means rotatably mounting said winding spool on said end caps,
   said winding spool having an inner helical ball screw track formed therein,
   a cylindrical ball nut disposed within said winding spool having a pair of endless helical ball tracks including a depressed ball return groove formed in the outer face thereof, said ball tracks in said ball nut being of the same pitch as the said helical ball screw track in said winding spool,
   sufficient balls disposed in each helical ball track and its depressed ball return groove in said ball nut substantially filing the same and registering with the inner helical ball screw track formed in said winding spool,
   said ball nut having a central cavity formed in its axially inner end extending to and terminating adjacent its closed axially outer end,
   a cylindrical spiral compression spring disposed longitudinally in spaced relationship freely around said hollow central shaft and extending from one said end cap to and within said central cavity in said ball nut,
   said compression spring being anchored at one end to said one end cap and at its other end to the said axially outer closed end of said ball nut at the bottom of said cavity therein,
   retractor supporting and anchorage means fixedly mounting said hollow central shaft of said retractor thereon with the sleeve type winding spool of said retractor turnable with respect thereto,
   said ball nut being constantly biased toward the other end cap including when said seat belt wound on said sleeve type winding spool is pulled out from its retracted position.

References Cited
UNITED STATES PATENTS

| | | | |
|---|---|---|---|
| 2,505,418 | 4/1950 | Martin | 242—107 |
| 3,077,324 | 2/1963 | Strickland | 242—107.4 XR |
| 3,178,136 | 4/1965 | Bayer | 242—107.4 XR |
| 3,206,137 | 9/1965 | Snyderman | 242—107.4 |

STANLEY N. GILREATH, Primary Examiner

W. H. SCHROEDER, Assistant Examiner

U.S. Cl. X.R.

74—89.15, 424.8